United States Patent [19]

Ward

[11] Patent Number: 4,516,628
[45] Date of Patent: May 14, 1985

[54] HEAT RECOVERY SYSTEM AND METHOD

[76] Inventor: William F. Ward, 5947 Winding Way, Sylvania, Ohio 43560

[21] Appl. No.: 429,967

[22] Filed: Sep. 30, 1982

[51] Int. Cl.³ .............................................. G05D 23/00
[52] U.S. Cl. ................................ 165/36; 165/DIG. 2; 236/13
[58] Field of Search ............. 237/55, 50; 165/DIG. 2, 165/34, 35, 36, DIG. 12; 126/101; 236/13

[56] References Cited

U.S. PATENT DOCUMENTS

| | | | |
|---|---|---|---|
| 2,570,859 | 10/1951 | Rasmussen | 236/13 |
| 3,791,351 | 2/1974 | Kent | 165/34 |
| 4,044,950 | 8/1977 | Engeling et al. | 237/55 |

*Primary Examiner*—Henry Bennett
*Attorney, Agent, or Firm*—Fraser & Clemens

[57] ABSTRACT

An air heater for recovering energy from process exhaust gases and the like includes a heat exchanger disposed in the flow of exhaust gases, a blower for supplying an independent flow of air to be heated in the exchanger and the control system including dampers, driving mechanisms and thermostats for adjusting air flow in order to maintain substantially constant heated output air temperature. One of the dampers is disposed at the outlet of the blower and adjusts, by a thermostat an appropriate drive mechanism, the volume of air supplied by the blower based on outlet temperature. A pair of dampers are connected in oppositely acting (face and bypass) fashion and adjust the proportion of air passing through or bypassing the heat exchanger, again based on the temperature of the outlet air as sensed by a thermostat.

12 Claims, 4 Drawing Figures

HEAT RECOVERY SYSTEM AND METHOD

BACKGROUND OF THE INVENTION

The invention relates generally to energy recovery systems and more particularly to an air heating system and method of operating same which recover energy from flue gases and the like and provide such heated air at a substantially constant temperature.

Dwindling reserves and increasing expense of fossil fuels have prompted a reexamination of nearly every aspect of mechanical and heat energy generation, utilization and ultimate disposition. Whereas the aspects of energy conversion such as fossil fuel into heat and the utilization of such energy have come under close scrutiny in recent years, a similar investigation with regard to the ultimate disposition of waste energy, i.e., energy not utilized in a given process or for an intended purpose, has occurred only to a significantly lesser extent.

Apparatus is known for the recovery of heat from exhaust flues and the like. For example, U.S. Pat. No. 2,895,719 discloses a method and apparatus for recovering heat from a fluid medium such as a stream of hot exhaust gas. In the device disclosed, high velocity gases create a condition which improves heat transfer to the flow of heated fluid. This device, however, is without apparatus for maintaining a constant output temperature and therefore the output temperature varies as a function of the volumes of heating and heated fluid and the inlet temperatures of the heated and heating fluid.

U.S. Pat. No. 4,050,627 discloses another heat recovery system for flues having a pair of independent passages in thermal communication. An adjustable baffle plate determines the proportion of the heat exchanger exposed to the flue gases and thereby adjusts the maximum energy transfer capability of the system. A thermostatically operated fan is also disclosed to provide forced air circulation through the system.

One method of temperature control known in the prior art is the utilization of a pair of adjustable dampers disposed in parallel in a flow path and associated respectively with a heating and cooling means or heating and non-heating means. The dampers are mechanically connected such that as one damper opens and permits flow therethrough the other damper closes. Temperature control schemes incorporating this approach are disclosed in U.S. Pat. Nos. 3,122,202, 3,139,020 and 3,650,318. From an entropy standpoint, such mixing systems are now appreciated to be inefficient and are therefore often considered to be undesirable.

An energy recovery system incorporating a bypass flow control is disclosed in U.S. Pat. No. 2,570,859. Here, exhaust gases are utilized to preheat outside air utilized for combustion. A control system monitors the temperature of the exhaust air exiting the heat exchanger in order to maintain it above a certain minimum temperature to inhibit condensation in the exhaust stack. The temperature controller is an averaging or totalizing type which also monitors the temperature of the air supplied to the inlet side of the heat exchanger and provides a controlling signal based upon the average temperature of the air to be heated prior to its passage through the heat exchanger and the temperature of the exhaust gas subsequent to its exit from the heat exchanger. This temperature signal is utilized to control not only bypass of inlet air around the heat exchanger but also recirculation of air through the heat exchanger. Finally, a flow meter is also utilized which adjusts the amount of recirculated air.

It is apparent from the foregoing that although apparatus has been heretofore produced for assisting the recovery of heat from exhaust gases and similar flows of heated air which would otherwise be wasted, such structures do not include control systems for accurately maintaining the temperature of the output stream of heated air. This can be a significant problem in installations utilizing the recovered heat for processes which require constant temperatures since the supply of waste heat may fluctuate greatly as process steps such as increased engine speed, batch heating or cooling, or other machine cycling occurs. Such prior art also does not disclose systems wherein the volume of air to be heated by the heat exchanger is reduced in order to maintain a constant output temperature, for example, when heat input to the heat exchanger is reduced.

SUMMARY OF THE INVENTION

An energy recovery system and method provides a flow of heated air at a substantially constant temperature. The air is heated by recovering energy from the exhaust gases of a process such as an oven or an internal combustion engine, for example. The exhaust gases are routed through one independent flow path of a heat exchanger and a counterflow of air to be heated is supplied by a blower. A control system including dampers, motors, and thermostats monitors the temperature of the heated, delivered air and adjusts the air flow in order to maintain a substantially constant output temperature. One of the dampers is positioned at the outlet of the blower and over a specified temperature band increases the flow of air supplied by the blower in response to an increase in delivered air temperature and vice versa. A pair of dampers, one disposed at the inlet of the heat exchanger and a second disposed in a bypass passageway around the heat exchanger are connected in opposing (face and bypass) fashion. They are likewise controlled by a thermostat having an equivalent proportional band which senses the delivered air temperature and adjusts the proportion of air bypassing or passing through the heat exchanger in order to maintain the delivered air temperature. Both thermostats preferably define a relatively narrow proportional temperature band, on the order of 4° to 8° F. The set point of the fan controlling the discharge of air from the blower is set approximately 4° to 5° below the set point of the thermostat controlling the face and bypass dampers. Upon a reduction in delivered air temperature occurring either by a reduction of the heat content of the flue gases passing through the heat exchanger or a reduction in inlet air temperature, the operating cycle reverses, closing the bypass damper while opening the face damper to the heat exchanger and sequentially, closing the blower discharge damper.

Thus it is an object of the instant invention to provide an energy recovery system and method for recovering heat energy from heated gases such as flue gases and the like.

It is a further object of the instant invention to provide an energy recovery system capable of providing substantially constant delivered air temperature.

It is a still object of the instant invention to provide an energy recovery system which proportions the quantity of air passing through and around a heat exchanger in order to maintain a substantially constant delivered air temperature.

DESCRIPTION OF THE PREFERRED EMBODIMENT

Figure 1:
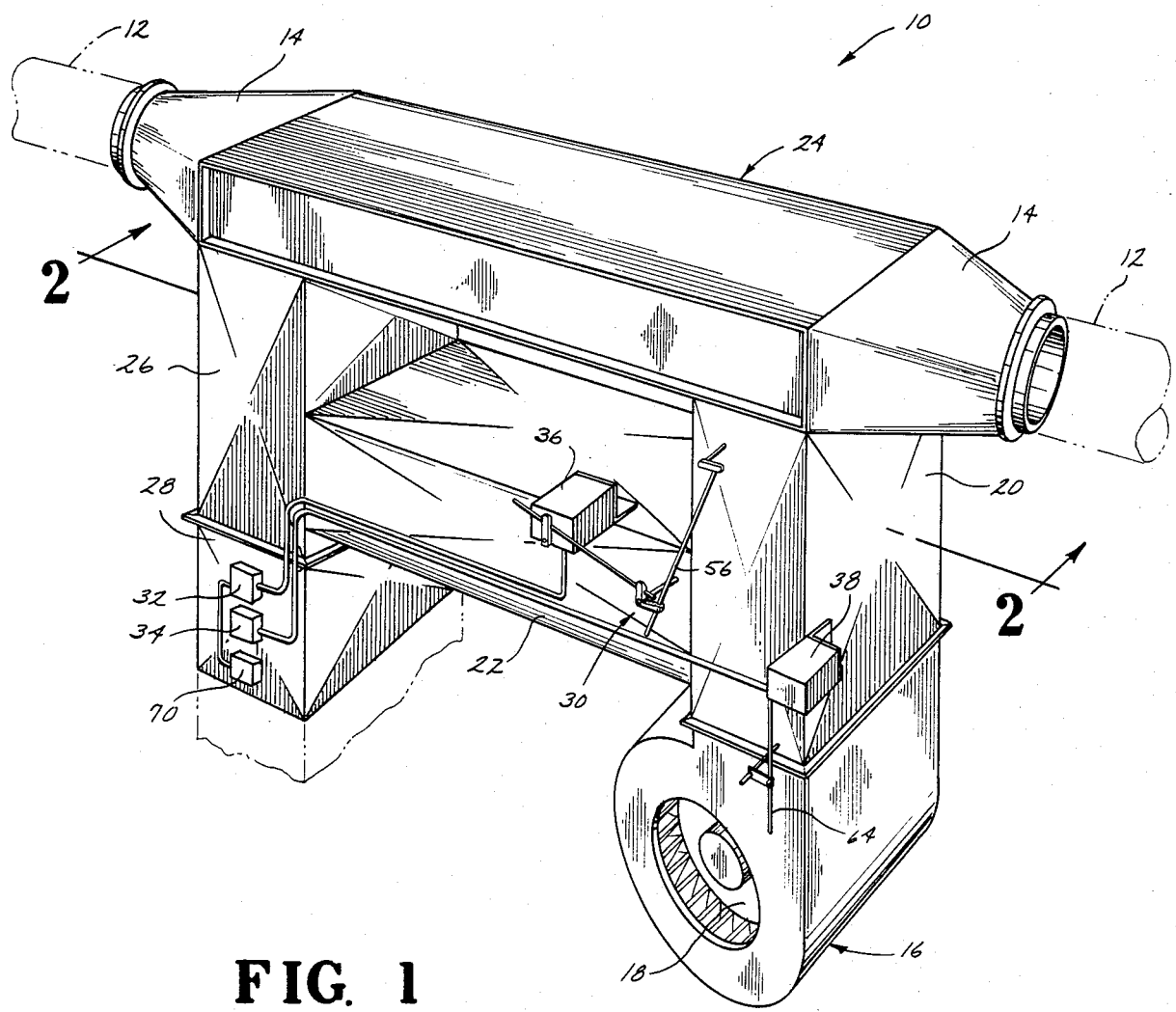
FIG. 1 is a perspective view of a heat recovery apparatus according to the instant invention.

Referring now to FIG. 1, a heat recovery apparatus according to the instant invention is illustrated and generally designated by the reference numeral 10. The heat recovery apparatus 10 is, as previously discussed intended to recover waste heat from exhaust and flue gases from internal combustion engines, industrial processes, boilers, heaters, and the like. As such, it is installed in a flue 12 from which a section has been removed which is substantially equal in length to the apparatus 10. The apparatus 10 may include a pair of transition ducts 14 which smoothly and in a streamline fashion change the flow cross section from the circular cross section of the flue 12 to the generally rectangular cross section of the apparatus 10. The heat recovery apparatus 10 also includes a blower assembly 16 which is driven by a prime mover such as an electric motor (not illustrated) for providing mechanical energy to a blower wheel 18. The output air flow from the blower assembly 16 is provided to an inlet duct 20. The inlet duct 20 communicates with both a bypass duct 22 and a heat exchanger assembly 24. As will be more fully described subsequently, the flows of air through the bypass duct 22 and heat exchanger assembly 24 recombine in a mixing duct 26. From the mixing duct 26, the air flow passes to an outlet duct 28. A control assembly 30 which will also be described more fully below, includes a pair of proportional thermostats 32 and 34 which sense the temperature of the air flowing through the outlet duct 28 and provide signals through electrical wiring to a pair of proportional positioning motors 36 and 38.

Figure 2:
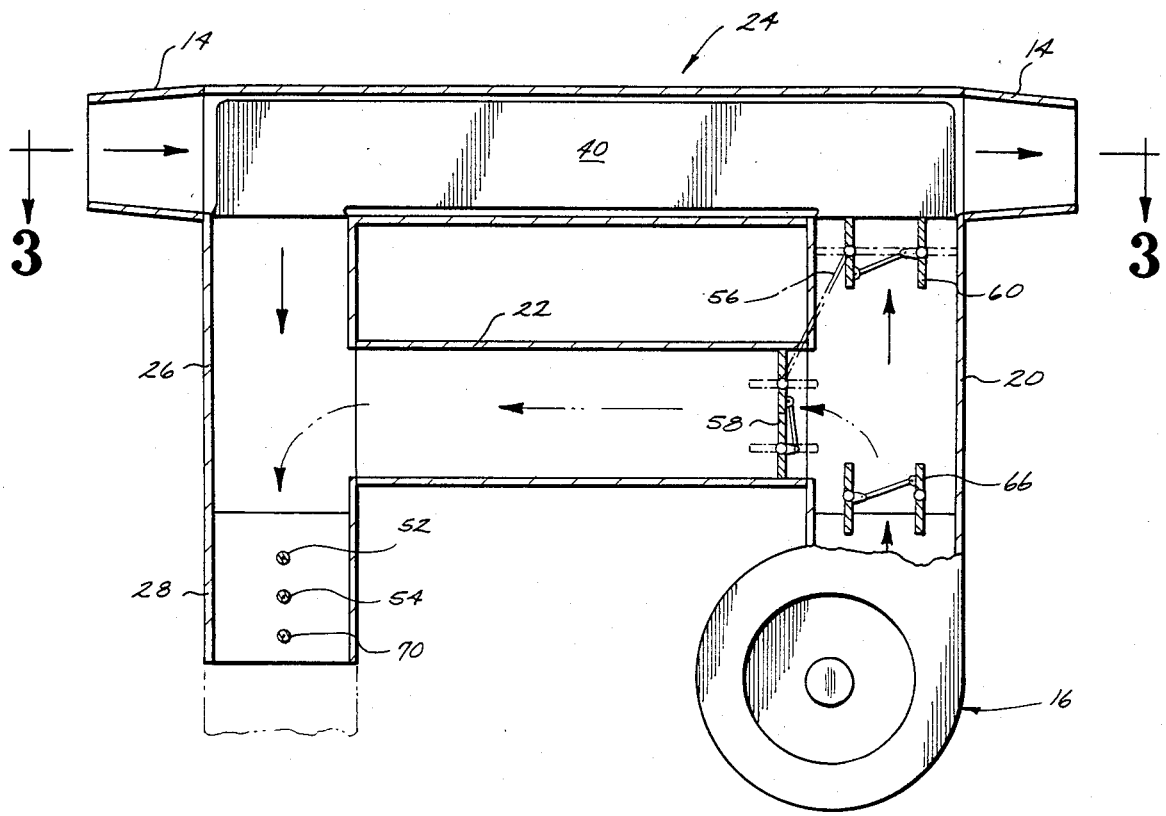
FIG. 2 is a fragmentary, sectional view of a heat recovery apparatus according to the instant invention taken along line 2—2 of FIG. 1.
Figure 3:
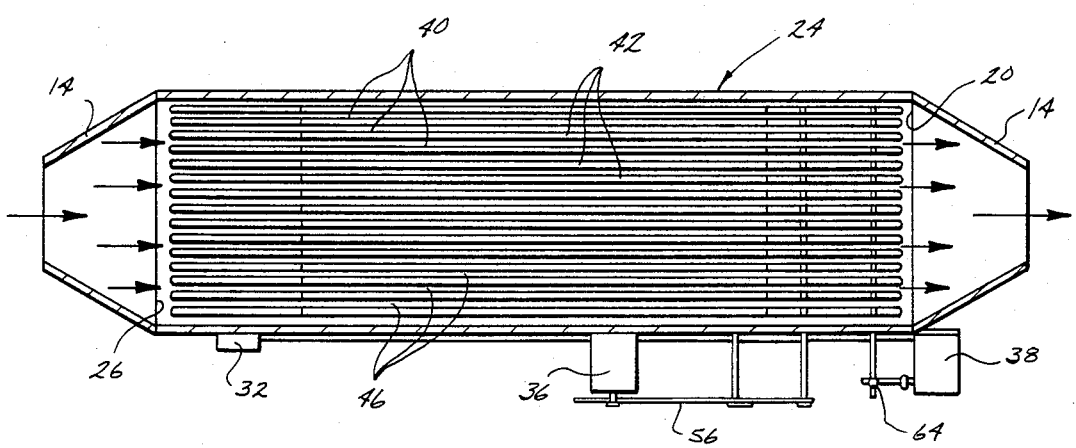
FIG. 3 is a full, sectional view of heat recovery apparatus according to the instant invention taken along line 3—3 of FIG. 2.

Referring now to FIGS. 2 and 3, the heat exchanger assembly 24 is seen to include a plurality of parallel plates 40 which function as heat transfer surfaces. In pairs, the plates 40 constitute elongate parallel sealed chambers 42 which define a plurality of parallel flow paths for the air delivered by the blower assembly 16. The plurality of flow paths through the elongate chambers 42 are in thermal communication, though isolated from, a like plurality of parallel flow paths in a like plurality of elongate parallel chambers 46 also defined by the parallel plates 40. Those familiar with conventional heat exchanger construction will appreciate and understand this design. As illustrated in FIGS. 2 and 3, flow through the elongate chambers 46, as illustrated by the arrows, is from left to right whereas flow through the elongate chambers 42 is generally from right to left. The heat exchanger 24 is thus of a counterflow design.

It should be understood, that the precise number of parallel plates 40 and thus corresponding number of parallel flow paths and elongate chambers 42 and 46 is a matter of design choice and may be varied widely in accordance with desired heat transfer characteristics, flow rates, and other variables. The heat exchanger assembly 24 may be fabricated of aluminum, stainless steel, or other suitable material as necessary given the nature and temperature of the gases flowing through the flue 12 and the chambers 46 of the heat exchanger assembly 24.

Referring now to FIGS. 1 and 2, the first proportional thermostat 32 includes a temperature sensing element 52 disposed in the outlet duct 28 and the second proportional thermostat 34 likewise includes a temperature sensing element 54 similarly disposed. The proportional thermostats 32 and 34 may be like or similar to electrical type TP-209 manufactured by the Barber-Colman Co. of Rockford, Ill. or pneumatic types manufactured by Johnson Controls Co. of Milwaukee, Wis. Electrical or pneumatic signals from the proportioning thermostat 32 are utilized to control the proportional motor 36 which, through a suitable linkage 56 controls and adjusts the positions of a first set of dampers 58 and a second set of dampers 60. The first set of dampers 58 is disposed in the bypass duct 22 and opens or closes to permit or inhibit air flow through the bypass duct 22. The second set of dampers 60 is disposed generally in the inlet duct 20 adjacent the heat exchanger assembly 24 and opens when the first set of dampers 58 closes to permit air from the blower assembly 16 to flow through the elongate chambers 42 of the heat exchanger assembly 24 and closes when the set of dampers 58 opens, to inhibit air flow through the chambers 42. Thus it will be appreciated that cooperatively, the first set of dampers 58 and the second set of dampers 60 proportions the flow of air delivered by the blower assembly 16 between the bypass duct 22 and the elongate chambers 42 of the heat exchanger assembly 24 in response to the mechanical output of the proportional positioning motor 36. The second proportioning thermostat 34 provides an electrical or pneumatic signal to the second proportional positioning motor 38 which, through a suitable linkage 64 positions a third set of dampers 66 disposed generally at the junction at the outlet of the blower assembly 16 and inlet duct 20. The third set of dampers 66 open and close to throttle and control the flow of air from the blower assembly 16 in response to the mechanical output position of the motor 38. The proportional positioning motors 36 and 38 may be like or similar to electrical types manufactured by Barber-Colman Co. or Honeywell, Inc. of Minneapolis, Minn. or to pneumatic types manufactured by Johnson Controls or Honeywell. The three sets of dampers 58, 60, and 66 are conventional and may include conventional parallel, paddle-type blades which are interconnected by suitable linkages such that the blades rotate in unison in a common direction or such that alternate blades rotate in unison and adjacent blades rotate in opposite directions. Those familiar with damper design will appreciate that these variations as well as variations in the total number of blades of each of the dampers 58, 60, and 66 are a matter of design choice and that all such damper designs are comprehended by the instant invention.

As noted previously, a significant difficulty in recovery systems of this design is the maintenance of a constant output air temperature in the face of varying energy content of the gases flowing through the flue 12 and heat exchanger assembly 24. Thus, if accurate delivered temperature in the outlet duct 28 is to be maintained, an accurate, broad-band temperature sensing and control scheme must be provided. Such control is provided by the instant arrangement of proportional thermostats 32 and 34 by virtue of their set points and throttling range or proportional band. Each of the thermostats 32 and 34 preferably has a proportional band or throttling range of 4° to 5°. It has been found that this range may be widened somewhat to 6° to 8° but cannot be satisfactorily reduced below about 4°. For purposes of this example, it will be assumed that the proportional bands of the thermostats 32 and 34 are set at 5°. The set points of the thermostats are then adjusted to temperature settings equal to or slightly greater than this number such that the first and second set of dampers 58 and 60 and the third set of dampers 68 operate in a sequential or stepped fashion. Specifically, the set point of the thermostat 32 which controls the first and second set of dampers 58 and 60 is set the same or slightly greater number of degrees above the thermostat 34 as the selected proportioning band. In this example, if the thermostat 32 were set at 110°, the thermostat 34 would be set at 105° or 104°. As an alternate example, if the proportioning bands of the thermostats 32 and 34 were set at 7°, the set point of the thermostat 32 would be adjusted to be about 7° above the set point of the thermostat 34 with a 4° throttling range the set points of the thermostats 32 and 34 would be set 4° to 5° apart, the thermostat 32 set to the higher temperature. In all cases, of course, the general range of the set points of the thermostats 32 and 34 is determined by the desired temperature of the air delivered by the heat recovery apparatus 10 as those familiar with such systems will readily appreciate.

Referring briefly to FIGS. 1 and 2, an added feature may be the addition of a carbon monoxide sensor 70 in the outlet duct 28 of the apparatus 10. The carbon monoxide sensor may be a model like or similar to the Toxgard Model C manufactured by Mine Safety Appliances Company of Pittsburgh, Pa. The carbon monoxide sensor 70 constantly monitors the carbon monoxide quantity of the air passing through the outlet duct 28. The output of the carbon monoxide sensor 10 is connected into the power and control systems of the heat recovery apparatus 10 so that when an excessive level of carbon monoxide is sensed by the sensor 70, power to the blower assembly 16 is terminated and the proportional positioning motor 36 cycles the first set of dampers 58 to their full open position while moving the second set of dampers 60 to their full closed position to inhibit to a maximum extent air flow through the elongate chambers 42 of the heat exchanger assembly 24.

Figure 4:
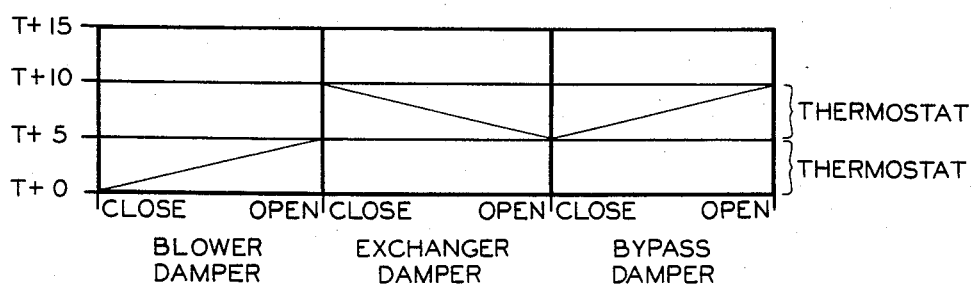
FIG. 4 is a graphic representation of the thermostatic control scheme of a heat recovery apparatus according to the instant invention.

In operation, the heat recovery apparatus will provide a temperature which varies only over a few degrees in response to significant changes in both inlet air temperature to the blower assembly 16 and the quantity of heat provided to the heat exchanger assembly 24 by the exhaust gases traversing therethrough. As FIG. 4 illustrates, the first proportional thermostat 32 senses the temperature of the air in the outlet duct 28 and opens the first set of dampers 58 in the bypass duct 22 and closes the second set of dampers 60 in the inlet duct 20 as the temperature in the outlet duct 28 begins to rise. Conversely, as the temperature in the outlet duct 28 drops the reverse action occurs. When the lower limit of the proportional band of the second thermostat 32 is reached, the first set of dampers 58 in the bypass duct 22 is fully closed inhibiting air flow therethrough and the second set of dampers 60 is fully opened causing all the air provided by the blower assembly 60 to flow through the heat exchanger assembly 24 and absorb the available heat energy. As the temperature in the outlet duct 28 drops further and enters the proportion band of the second proportional thermostat 34, the third set of dampers 66 disposed at the outlet of the blower assembly 16 begins to cycle from open to closed. Given the closed loop nature of the system, the second proportional positioning motor 38 will adjust the position of the third set of dampers 66 such that appropriate air flow through the heat exchanger assembly 24 is provided to maintain the temperature, if possible, within the proportional band of the second thermostat 34. If the temperature sensed by the second thermostat 34 drops to the lower limit of its proportional band or below, the third set of dampers 66 will fully close. In response to increasing temperatures in the outlet duct 28, the reverse damper motion will occur.

The foregoing disclosure is the best mode devised by the inventor for practicing this invention. It is apparent, however, that methods and apparatus incorporating modifications and variations will be obvious to one skilled in the art of energy recovery. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

I CLAIM:

1. An energy recovery apparatus comprising, in combination, heat exchanger means having a first flow path and an independent second flow path in thermal communication with said first flow path, blower means for providing a flow of gas through said second flow path of said heat exchanger, duct means for bypassing said second flow path of said heat exchanger, duct means for receiving said second flow of gas from said heat exchanger and said bypass duct means, first damper means for controlling the flow of gas through said bypassing duct means, second damper means for controlling the flow of gas from said blower means, third damper means for controlling a flow of gas through said second flow path of said heat exchanger, first control means for sensing the temperature of said second flow of gas in said receiving duct means and adjusting the positions of said first and said third damper means, and second control means for sensing the temprature of said second flow of gas in said receiving duct means and adjusting the position of said second damper means.

2. The energy recovery apparatus of claim 1 wherein said first control means includes means coupling said first and said third damper means for opening said first damper means while closing said third damper means and vice versa.

3. The energy recovery apparatus of claim 1 wherein said first and said second control means each includes a proportional thermostat and the set point of said first proportional thermostat is above the set point of said second proportional thermostat by an amount equal to the proportional band of said first thermostat.

4. The energy recovery apparatus of claim 1 wherein said first control means includes a proportional thermostat having a throttling range of about 5°.

5. The energy recovery apparatus of claim 1 wherein said second control means includes a proportional thermostat having a throttling range of about 5°.

6. The energy recovery apparatus of claim 1 wherein said first control means includes a proportional thermostat having a throttling range of about 5°, said second control means includes a proportional thermostat having a throttling range of about 5° and the set point of said proportional thermostat of said first control means is approximately 5° above the set point of said proportional thermostat of said second control means.

7. A method of operating an energy recovery apparatus having a heat exchanger having first and second isolated flow paths in thermal communication, comprising the steps of:
providing a first flow of gas at an elevated temperature through said first flow path,
providing a second flow of gas at a temperature below said elevated temperature through said second flow path,
providing a third flow of gas through a third flow path parallel to said second flow path, said second and third flows of gas being provided from a common source,
providing a coupled set of face and bypass dampers to control the proportion of said second and third flows of gas passing through said second flow path and said third flow path, respectively,
providing a third set of dampers to control the volume of said flow of gas from said common source,
combining said second and third flows of gas into a common flow of gas,
sensing the temperature of said common flow of gas and opening said face damper while closing said bypass damper as such sensed temperature lowers across a first, higher temperature range, and
sensing the temperature of said common flow of gas and closing said third set of dampers as such sensed temperature lowers across a second, lower temperature range.

8. The method of claim 7 wherein said sensed temperature ranges are substantially equal.

9. The method of claim 7 wherein the lower limit of said first, higher temperature range is substantially coincident to the upper limit of said second, lower temperature range.

10. The method of claim 7 wherein said first, higher temperature range is approximately 5°.

11. The method of claim 7 wherein said second, lower temperature range is approximately 5°.

12. The method of claim 7 wherein said first, higher temperature range is approximately 5°, said second, lower temperature range is approximately 5°, and the lower limit of said first, upper temperature range is substantially coincident to the upper limit of said second, lower temperature range.

* * * * *